(12) United States Patent
Robbins (10) Patent No.: US 8,054,363 B2
(45) Date of Patent: Nov. 8, 2011

(54) DETERMINING THE MULTIPLICATION OF EMCCD SENSOR

(75) Inventor: Mark Stanford Robbins, Brentwood (GB)

(73) Assignee: E2V Technologies (UK) Limited, Chelmsford (GB)

( * ) Notice: Subject to any disclaimer, the term of this patent is extended or adjusted under 35 U.S.C. 154(b) by 410 days.

(21) Appl. No.: 12/205,176

(22) Filed: Sep. 5, 2008

(65) Prior Publication Data

US 2009/0231456 A1 Sep. 17, 2009

(30) Foreign Application Priority Data

Sep. 7, 2007 (GB) .................................. 0717484.0

(51) Int. Cl.
*H04N 5/335* (2006.01)
(52) U.S. Cl. ...................................................... 348/311
(58) Field of Classification Search ................. 348/222.1
See application file for complete search history.

(56) References Cited

U.S. PATENT DOCUMENTS

| | | | | |
|---|---|---|---|---|
| 4,585,934 A | * | 4/1986 | French et al. | 257/227 |
| 5,337,340 A | * | 8/1994 | Hynecek | 377/60 |
| 6,444,968 B1 | | 9/2002 | Burt et al. | |
| 7,184,085 B2 | * | 2/2007 | Hakamata et al. | 348/311 |
| 7,250,595 B2 | * | 7/2007 | Hillis et al. | 250/214 A |
| 7,265,397 B1 | * | 9/2007 | Tower et al. | 257/223 |
| 7,291,821 B2 | | 11/2007 | Robbins | |
| 7,609,311 B2 | * | 10/2009 | Denvir | 348/311 |
| 7,796,171 B2 | * | 9/2010 | Gardner | 348/254 |
| 7,807,952 B2 | * | 10/2010 | Hazelwood | 250/208.1 |
| 2002/0093288 A1 | * | 7/2002 | Spencer et al. | 313/523 |
| 2003/0035057 A1 | * | 2/2003 | Hakamata et al. | 348/311 |
| 2003/0223531 A1 | * | 12/2003 | Kashima et al. | 377/57 |
| 2004/0150737 A1 | * | 8/2004 | Pool et al. | 348/311 |
| 2006/0163474 A1 | * | 7/2006 | Denvir | 250/305 |
| 2007/0200052 A1 | * | 8/2007 | Seyfried et al. | 250/201.3 |
| 2009/0086055 A1 | * | 4/2009 | Tower et al. | 348/229.1 |

FOREIGN PATENT DOCUMENTS

| | | |
|---|---|---|
| EP | 1 688 960 | 8/2006 |
| GB | 2 371 403 A | 7/2002 |
| GB | 2 413 007 A | 10/2005 |

(Continued)

OTHER PUBLICATIONS

United Kingdom Search Report dated Jan. 7, 2008, issued in connection with counterpart GB Application No. 0717484.0.*

(Continued)

*Primary Examiner* — Lin Ye
*Assistant Examiner* — Amy Hsu
(74) *Attorney, Agent, or Firm* — Venable LLP; Robert Kinberg; Christopher Ma (57) ABSTRACT

A method and device having a CCD in which charge multiplication is obtained by applying drive voltages to clocking elements and is arranged to derive the gain provided by the multiplication elements from at least first and second output signals. The CCD is operated at a first voltage or temperature setting, and then a second voltage or temperature setting and the output signals derived with the CCD imaging a substantially constant scene. The gain at a given voltage or temperature setting can then be derived as a function of the different operational voltage of temperature setting. The method and device can also derive the gain as a function of the rate of change of output signal with an operational parameter such as voltage or temperature.

21 Claims, 6 Drawing Sheets

FOREIGN PATENT DOCUMENTS

| | | |
|---|---|---|
| JP | 2003-009000 | 1/2003 |
| WO | WO-2005/013605 A1 | 2/2005 |

OTHER PUBLICATIONS

UK Search Report dated Jan. 25, 2006, issued in connection with counterpart British Application No. GB0521651.0.

Written Opinion issued by the European Patent Office on Dec. 1, 2009, in corresponding Netherlands Appl. NL1032725 (with partial English language translation).

Robbins, Mark Stanford, et al., "The Noise Performance of Electron Multiplying Charge-Coupled Devices," *IEEE Transactions on Electron Devices*, vol. 50, No. 5, May 2003.

Hynecek, Jaroslav, "Impactron—A New Solid State Image Intensifier," *IEEE Transactions on Electron Devices*, vol. 48, No. 10, pp. 2238-2241, Oct. 2001.

UK Patent Office Search Report, dated Jun. 27, 2006, issued in connection with counterpart British Application No. GB0602965.6.

EPO Search Report, dated Apr. 24, 2008, issued in connection with counterpart EP Application No. 07250602.5.

\* cited by examiner

Figure 7

DETERMINING THE MULTIPLICATION OF EMCCD SENSOR

CROSS REFERENCE TO RELATED APPLICATIONS

This application claims priority from Great Britain Application No. 0717484.0 filed Sep. 7, 2007, the disclosure of which is incorporated herein by reference in its entirety

FIELD OF THE INVENTION

The present invention relates to a CCD device, and in particular to a CCD which provides gain within the charge domain.

BACKGROUND OF THE INVENTION

In a typical CCD imager, signal charge representative of incident radiation is accumulated in an array of pixels in an image area. Following an integration period, signal charge is transferred to a store section and then to an output register by applying appropriate clocking or drive pulses to control electrodes. The signal charge is then read out from the output register and applied to a charge detection circuit to produce a voltage that is representative of the amount of signal charge. The sensitivity of such a device is limited by the noise of the charge to voltage conversion process and that introduced by the subsequent video chain electronics.

Figure 1:
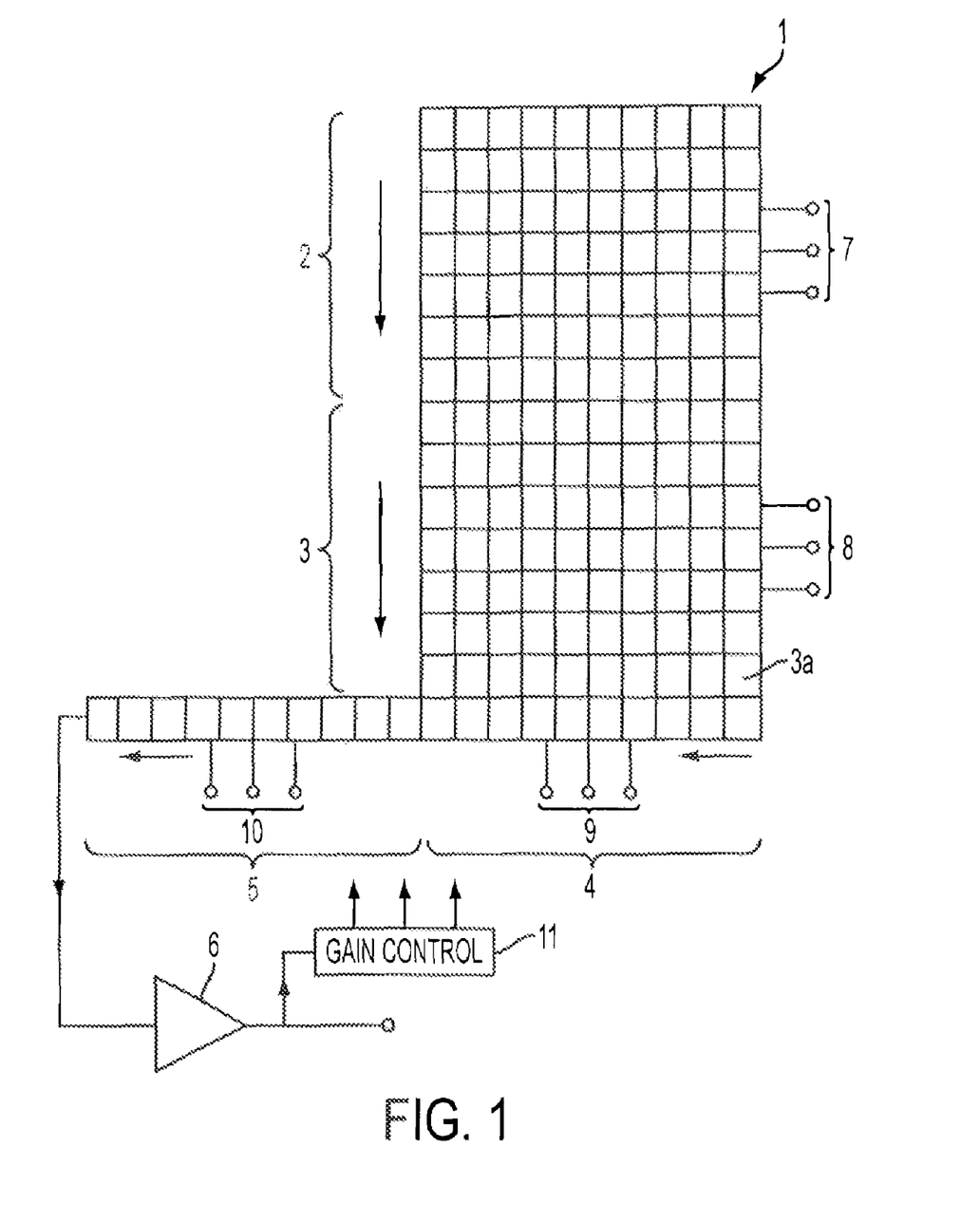
FIG. 1: is a schematic diagram of a CCD imager of known type and which may embody the invention.

An electron multiplying CCD (EMCCD) overcomes this limitation and is disclosed in our earlier published UK patent application GB-A-2,371,403, as shown in FIG. 1. A CCD imager 1 comprises an image area 2, a store section 3 and an output or read-out register 4, each of these components being found in a conventional CCD imager. The output register 4 is extended serially to give a multiplication register 5, the output of which is connected to a charge detection circuit 6.

During operation of the device, incident radiation is converted at the image area 2 into signal charge which is representative of the intensity of the radiation impinging on the array of pixels making up the image array. Following the image acquisition period, drive pulses are applied to control electrodes 7 to transfer the charge accumulated at the pixels of the image area 2 to the store section 3. Simultaneously with this, drive signals are also applied to control electrodes 8 at the store section 3 to cause charge to be transferred from row to row as indicated by the arrow, the last row of charge held in elements in row 3 being transferred in parallel to the output register 4.

When a row of signal charge has been transferred into the output register 4, appropriate drive pulses are applied to the electrodes 9 to sequentially transfer the charge from the elements of the output register to those of the multiplication register 5. In this embodiment, the multiplication register is of similar architecture to the output register in so far as doping is concerned with the addition of an electrode for multiplication.

To achieve multiplication of charge in each of the elements of the multiplication register 5, sufficiently high amplitude drive pulses are applied to control electrodes 10 to both transfer signal charge from one element to the next adjacent element in the direction shown by the arrow and also to increase the level of signal charge due to impact ionisation by an amount determined by the amplitude of the drive pulses. Thus, as each packet of charge is transferred from one element to the next through the multiplication register, the signal charge increases. The charge detected at circuit 6 is thus a multiplied version of the signal charge collected in the output register 4. At each stage of the multiplication register, the signal charge is increased. Each signal charge packet stored in the output register 4 undergoes an identical multiplication process as each travels through all the elements of the multiplication register 5.

The output of the charge detection circuit 6 is also applied to an automatic gain control circuit 11 that adjusts the voltages applied to the multiplication register 5 to control the gain. In other embodiments, this feedback arrangement is omitted. Gain may then be controlled manually if desired.

Whilst the gain control circuit can vary the gain provided by varying the voltages applied to the multiplication register, we have appreciated the need to determine the actual level of gain provided by such a CCD charge multiplication arrangement. One way to measure the gain is to inject a known amount of signal into the multiplication register and monitor the output. The difficulty with this approach is knowing what the input signal is. Typically this signal will be below the noise floor of the video chain if multiplication gain is not applied. Therefore measuring the signal with and without gain is not a practical proposition.

The approach usually taken to measure the gain is to illuminate the device and to measure the output with no multiplication gain. The light level is then reduced by a known fraction (by reducing the aperture of the optics or using neutral density filters for example). The reduction of light level will be of the same order as the gain to be measured. Multiplication gain is then applied and the output signal is measured. The multiplication gain can be calculated knowing the output signal and the reduction in light level. This method can give accurate results but is cumbersome and not particularly suitable for automatic measurements within a camera system.

It has been proposed that the distribution of output signal can be used to calculate the multiplication gain. This method involves the analysis of the statistical variation of the output signal from very small input signals. The input signals derive from sources such as dark signal but signals derived from the scene being viewed are not used. The main disadvantage of this method is that light from the scene must be prevented from reaching the sensor during the measurement of gain. This would require an efficient shutter arrangement or the application of some other optical shielding. In many cases this is not practically possible or desirable.

We have appreciated that an improved method of determining the gain of an electron multiplying CCD would be desirable. We have further appreciated that a method that does not require illumination with known relative light levels, or shuttering of the CCD, would be simpler to implement and operate during normal use of a CCD.

SUMMARY OF THE INVENTION

The invention is defined in the claims to which reference is now directed.

The invention provides a method and a CCD device in which a plurality of multiplication elements provide charge multiplication. The method operates by measuring two or more samples of an output signal from the CCD from which the gain at given settings of the CCD is derived. Counterintuitively, the method and device do not require any determination of the illumination level incident on the CCD, or determination of a charge input to the CCD.

BRIEF DESCRIPTION OF THE DRAWINGS

An embodiment of the invention will now be described by way of example and with reference to the accompanying figures in which.

DETAILED DESCRIPTION

The present embodiment comprises a CCD device such as a CCD imager operated in a manner that allows derivation of the gain using output signals without requiring knowledge of the illumination level incident upon the CCD, or knowledge of an input signal level.

The invention is embodied in a method of operating a CCD device or operating an apparatus incorporating a CCD device, such as a camera. The invention is also embodied in an apparatus, such as a camera, configurable by hardware or software to operate the gain calibration method. The embodying method and apparatus derive the gain of an electron multiplying CCD by two or more measurements of an output signal and also measurements of parameters such as drive voltages or temperature, which may be referred to as operational parameters of the CCD device.

A known device is shown and has been described in relation to FIG. 1. The invention may be embodied in such a device, and in an imager or camera including such a device. The arrangement of a multiplication register and elements within that register to which the invention may be applied will first be described with reference to FIGS. 1 to 3.

As shown in FIG. 1, an image area 2 accumulates charge in CCD elements and transfers charge under control of clocked drive pulses on electrodes 7, 8 to a store area 3 and from the store area to an output register 4 and subsequently to a multiplication register 5. Although shown as a straight-line extension of the output register 4, in reality it will probably be bent around the imager for packaging reasons.

Figure 2:
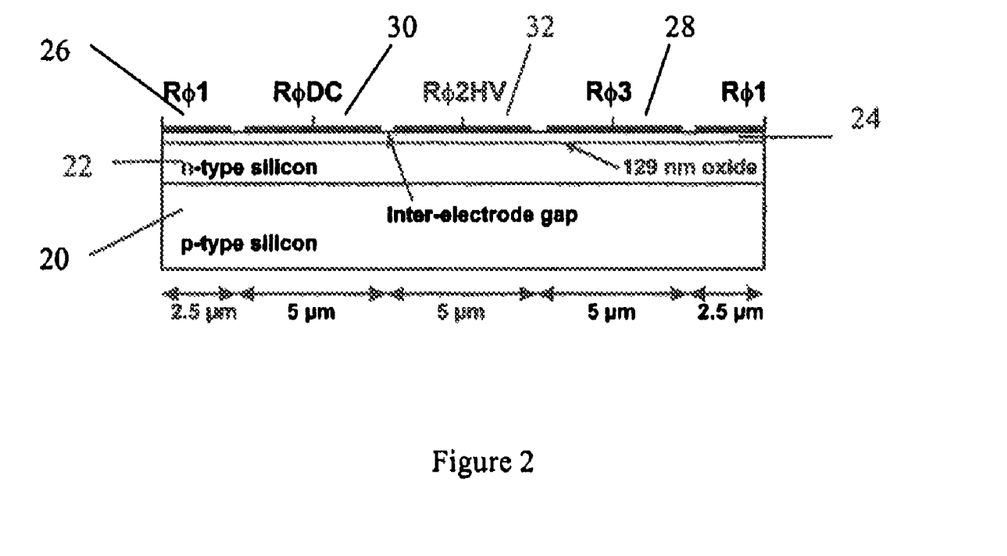
FIG. 2: is a schematic diagram of a physical cross section of one element in a multiplication register.

A multiplication element of known type is shown in FIG. 2. The element comprises a base 20 of p-type silicon, an n-type layer 22 and a gate dielectric layer 24 which may, as an example, comprise a layer of Si3N4 over SiO2 or SiO2 only. On the gate dielectric layer, each element has four electrodes shown as normal clocked electrodes φ1 26 and φ3 28, a DC electrode φDC 30 and a high voltage electrode φ2HV 32. The element provides gain by clocking voltages at the electrodes such that a relatively high voltage at electrode φHV 32 causes impact ionisation of charge. The naming convention of the electrodes in the format "Rφ1" as shown in the diagrams is well known and will be referred to herein as "φ1" for brevity. Similarly, the high voltage electrode "φ2HV" may be referred to as "φ2" for brevity.

Figure 3:
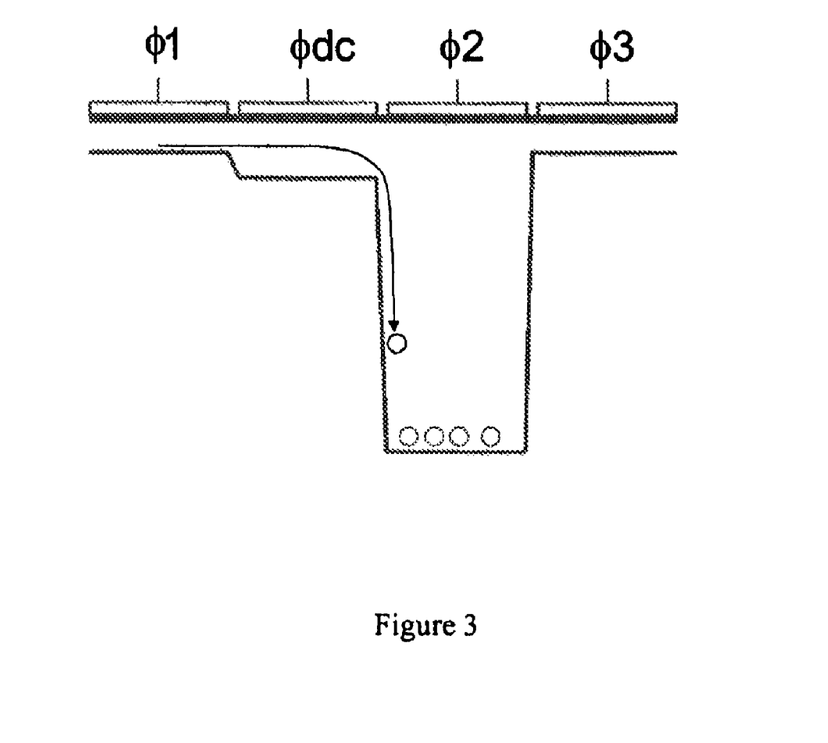
FIG. 3: is a schematic cross section of a single multiplication element showing voltages applied to electrodes at a point in time.

A schematic cross section of a single multiplication element is given in FIG. 3. The multiplication element of the multiplication register is made up of four phases although other configurations could be possible. φ1 and φ3 are clocked as normal readout register phases. φDC is a DC phase that separates φ1 from φ2. The high voltage electrode φ2, the multiplication phase, is a clocked phase but using a much greater amplitude than φ1 and φ3. On the high to low transition of φ1 (the potential increasing in the direction of the arrow in FIG. 3), the signal originally under φ1 will drift to φ2. The potential on φ2 is set high enough so that the fields experienced by the electron signal will cause impact ionisation to take place. Once the signal electrons and the electrons created by the impact ionisation are collected under φ2 the total amplified signal can then be transferred to φ by switching φ2 low and φ high. The process is repeated through all the gain (multiplication) elements in the multiplication register. As an example, the device could have 591 gain elements. If the impact ionisation increases the signal by 1% at each element, the combined gain of the multiplication register of the CCD will be $1.01^{591}=358$.

As shown, charge is increased in each (multiplication) element by application of voltage at φ2 (HV) which causes electrons to form from the impact ionisation process. It is noted, for the avoidance of doubt, that the voltages shown are clocked and so vary in amplitude. The voltages are shown at a given instant.

Figure 4:
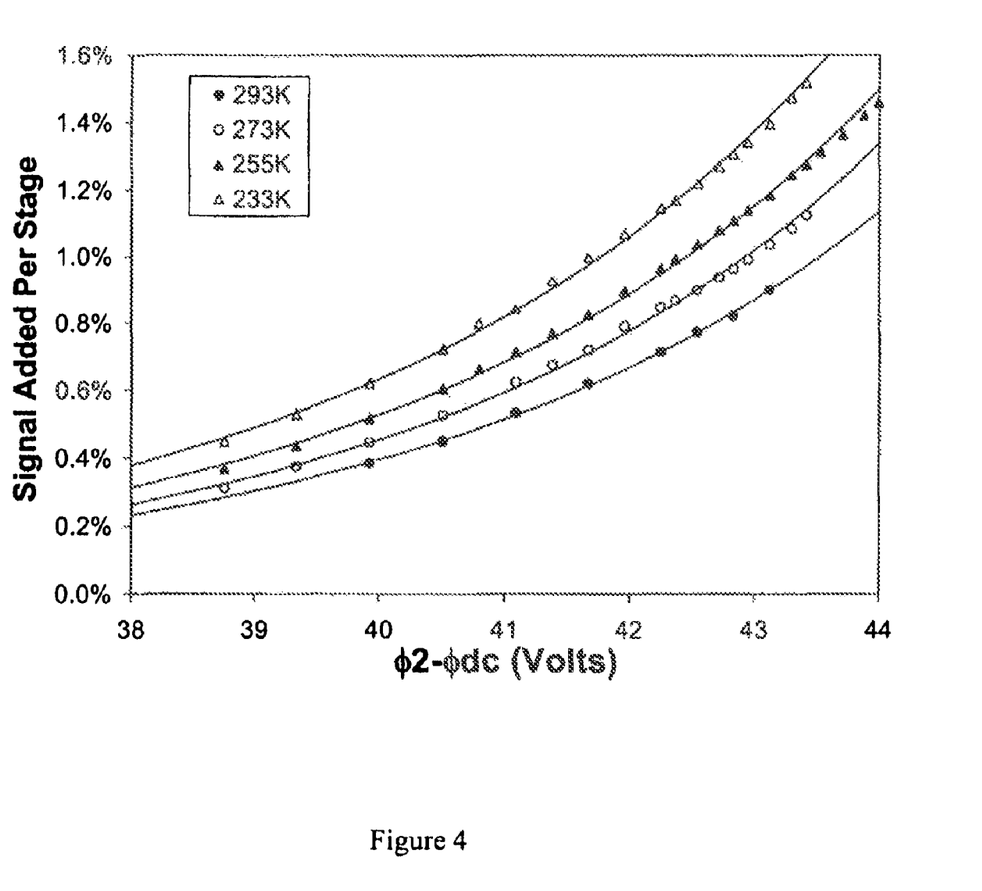
FIG. 4: is a chart showing the relationship between voltage difference between electrodes of an elements and the signal added.

The gain of each multiplication element is dependent on the potential applied between the high voltage electrode (φ2) and the preceding DC phase (φdc) as shown in FIG. 4.

Any number of these elements can be employed in sequence so that when charge leaves one element it enters the next. Usually the fraction of signal added for each multiplication element is the same (ignoring statistical variations). In this case the total multiplication gain then applied to the signal is thus $$G=(1+\alpha)^N$$

where α is the fraction of signal added per stage and N is the number of stages. Typically N will be between 400 and 600. For an N of 600 and an α of 1.2% the total gain is 1283.

Ideally the gain from the sensor could be estimated by knowing the characteristics of the sensor (such as shown in FIG. 4). Knowing the clock amplitudes and DC biases the gain can then be calculated. However, the gain characteristics vary with temperature as shown in FIG. 4. Also the characteristics can change with operational time. The multiplication gain drops as the device is used and increasing φ2 amplitude is required to maintain the gain. This is known as ageing. The rate of ageing depends on many factors including the total signal passing through the multiplication register and the multiplication gain being employed. Fortunately the rate of ageing decreases with operating time enabling useful operation over many years. However, the temperature dependence and ageing means that the gain cannot sensibly be assumed and if the value of gain is required it will have to be measured.

The method of the present invention enables a convenient measurement of gain that can be easily implemented within an existing system. The measurement can take place whilst viewing a scene with light incident on the device.

We have appreciated that the total gain from the multiplication register can be described by the following relationship:

$$G \approx (1+X(T)Y(V)Z(t))^N \tag{1}$$

where X(T) is a function of temperature, Y(V) is a function of applied potential (or electric field) and Z(t) is a function of time. A key feature of this appreciation is that the gain is described by functions of temperature (T) and voltage (V) that are independent of one another. For a range of device architectures it has been shown that $$Y(V) \propto \exp(cV)$$

where V is the potential difference between the high level of the φ2 pulse and the φ DC phase and c is a constant, independent of time and approximately independent of temperature. The value of c will be fairly constant from device to device but may vary between device types when the structure of the multiplication element changes.

Equation 1 can be rewritten as $$G \approx (1+\beta \exp(cV))^N \quad (2)$$

$\beta$ is independent of V but dependent on temperature and time. For the usual range of gains (usually less than 5000×) and number of multiplication elements (usually greater than 400) equation 2 can be simplified to give $$G \approx \exp(N\beta \exp(cV)) \quad (3)$$

We have appreciated the existence of the relationship described in equation (3) and the understanding of its implications for the measurement of gain.

Consider the situation where the multiplication gain has to be measured for a given $\phi 2$ amplitude. The mean signal out of the device is S1 for a signal, Sin, prior to multiplication and the difference between high level of $\phi 2$ pulse and the $\phi DC$ phase is V1. The mean output signal is given by $$S_1 = G_1 S_{in} = S_{in} \exp(N\beta \exp(cV_1)) \quad (4)$$

Where G1 is the gain to be measured. Now let us change the difference between high level of $\phi 2$ pulse and the $\phi DC$ phase to V2. The multiplication gain will change resulting in a change in output signal. V2 is chosen so that the output signal is still measurable above the noise of the output circuit. The new output signal, S2, is given by $$S_2 = S_{in} \exp(N\beta \exp(cV_2)) \quad (5)$$

Combining (4) and (5) gives $$G_1 = \exp\left(\frac{\exp(cV_1)}{\exp(cV_1) - \exp(cV_2)} \ln\left(\frac{S_1}{S_2}\right)\right) \quad (6)$$

Thus the multiplication gain can be calculated without needing to know the exact temperature of the device or how much it has aged. Usually $V_2$ would be chosen so that $S_2$ is roughly 10% of $S_1$. Equation (6) becomes obvious if $V_2$ is so low that close to unity gain is achieved. Thus $V_2$ should be set so that the multiplication gain is greater than unity and $S_2$ is above the noise floor of the video chain. The value of $S_1$ or $S_2$ may be obtained by averaging a number of frames, either on-chip or off chip.

Figure 5:
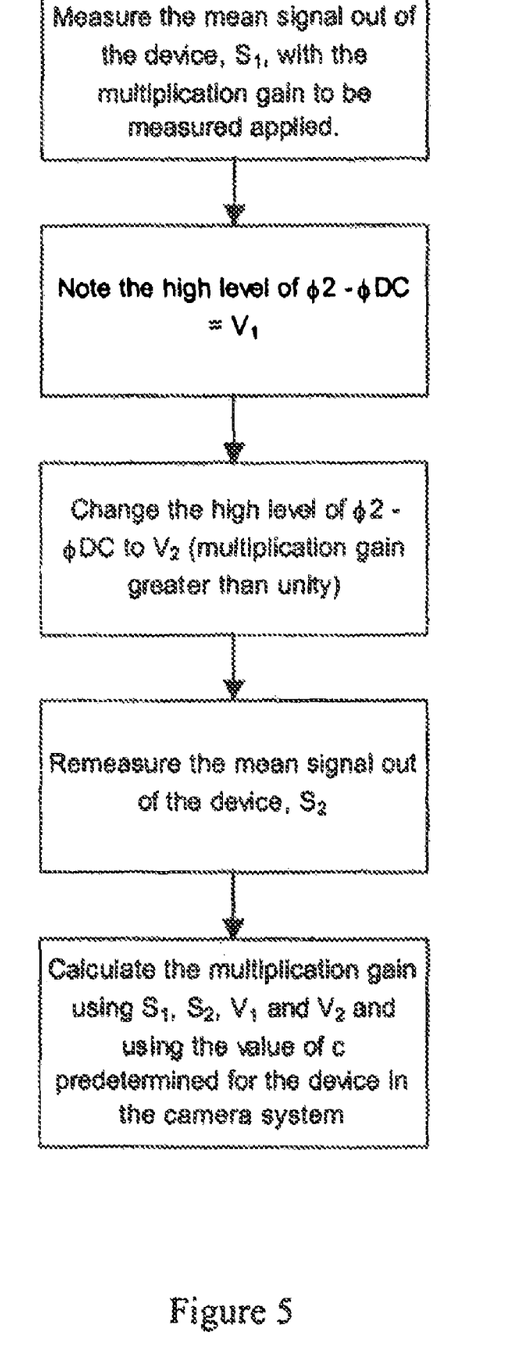
FIG. 5: is a chart showing the method of operating a CCD according to the invention.

A chart summarising the method for measuring gain embodying the invention is given in FIG. 5. In a first step, the mean signal $S_1$ from the CCD sensor is measured with the voltage applied to the multiplication stage set to provide the desired output level. This can be done while the CCD is imaging a scene. The mean signal $S_1$ may be the sum of signal derived from all pixels of a given line, frame or even multiple frames. The choice of how the signal $S_1$ is derived will depend upon factors such as the amount of noise, rate of change of the scene being imaged and so on. The key point is that the signal $S_1$ should be representative of the signal gain provided by the CCD with the first voltage setting $V_1$. The voltage level $V_1$ is noted either by detecting the voltage applied or by knowing the voltage applied by the control circuitry at a second step.

The drive voltage applied is then changed to a second voltage $V_2$, in a third step, and then in a fourth step the mean signal out of the CCD $S_2$ is measured with the second voltage setting. As with the measurement of $S_1$ the mean signal $S_2$ is measured on the same basis, such as the average signal level from pixels of a whole frame. Again the CCD continues to image the same scene. Preferably, the sample mean output signals are taken in quick succession, such as from consecutive frames such that there will be very little variation in the mean signal level. This assumes that the scene being viewed does not change mean illumination level rapidly.

Lastly, in the final step, the gain is calculated using the values obtained for $V_1$ $V_2$ $S_1$ and $S_2$ and the value c which is a predetermined constant for the device.

Normally the value of c would be determined in the camera system just once. This would occur at the factory prior to the dispatch of the camera system to the end user. A detailed characterization of the multiplication gain could be undertaken to calculate c. A more practical proposition requiring less time is to measure the gain accurately using neutral density filters, for example, at a single value of V1. The output signal is noted. The difference between the high level of $\phi 2$ pulse and the $\phi DC$ phase is changed to V2 and the new output signal is noted. As the gain at V1 is known, equation (6) can be solved by iteration to give c. This value of c defines the gain characteristic of that sensor in the camera system throughout the life of the sensor. It is approximately independent of temperature and, if used to calculate gain at temperatures other than where it was determined, a good measurement of gain will result. However, for the most accurate results, c should be determined either at the operating temperature, or over the range of expected operating temperatures. The value of c does not change with time.

Figure 6:
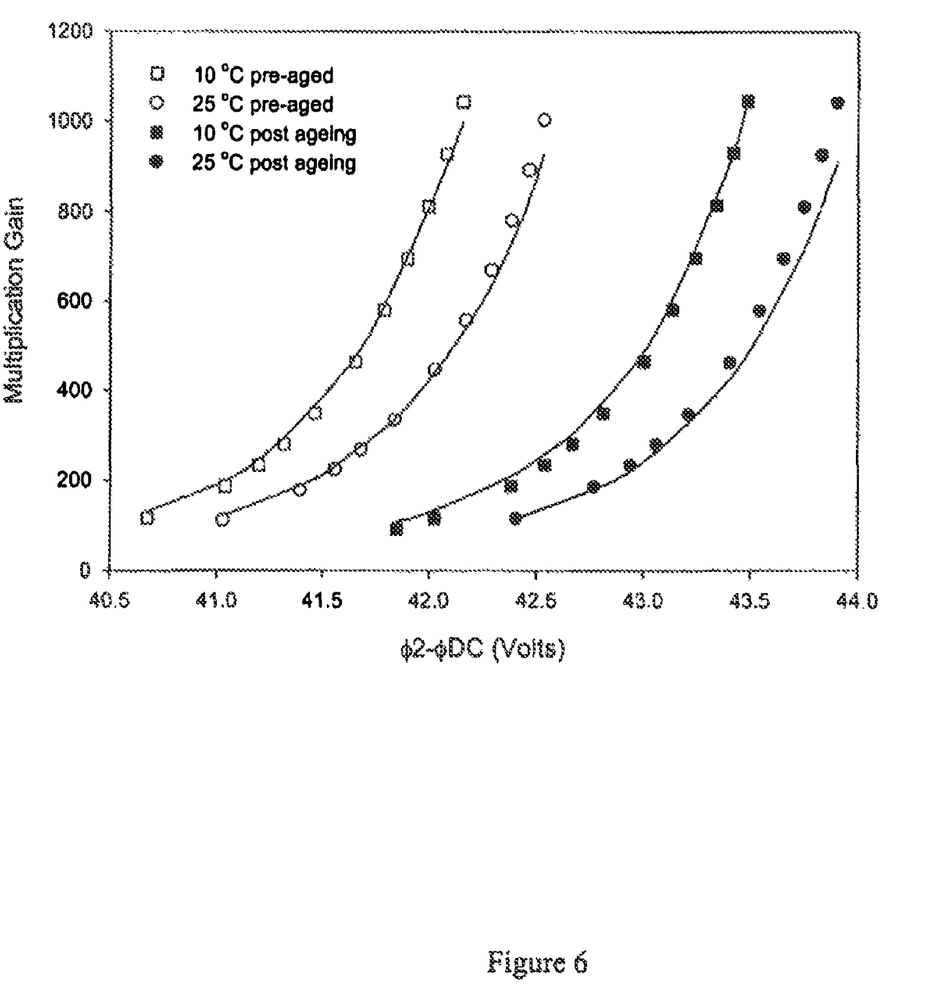
FIG. 6: is a graph showing measurements of gain derived by a method according to the invention.

To demonstrate the utility of the new method it has been used on an e2v technologies CCD97 device and compared with the results from a careful characterisation of the same device. The results are shown in FIG. 6. The value of c was calculated at a single point (gain approximately 800×) at a temperature of 10° C. prior to the device being aged significantly. The same value was use for the calculation of gain at 25° C. and at the same temperatures after the device had been aged to a level equivalent to an operating time of several tens of thousands of hours under normal conditions. Here the gain has been calculated to within 15% of the rigorously measured values over this range of temperature and a wide range of operating life. This is just by knowing the value of c at a single temperature at the start of life, and the signal out of the device for two values of □2 clock amplitude.

A system that incorporates the method would comprise the usual EMCCD drive and output circuits shown in FIG. 1. The recording of the output signal, preferably a mean output signal (temporally and spatially filtered), along with a measurement or recording of the applied potential difference between the high level of the $\phi 2$ pulse and the $\phi DC$ phase can be achieve with purpose designed hardware or a more general purpose processor and software. Such hardware or processor and software can include a method for (i) changing the bias voltage applied (ii) for storing the value or values of c (iii) for calculating the multiplication gain using the signal and potential values. Preferably the calculation will be undertaken within a DSP or FPGA but it could be envisaged that the calculation be performed using analogue techniques. The method is also ideally suited to a computer controlled camera system where all the calculations can be undertaken within the computer.

In some situations it may be preferable to keep the applied biases constant but instead record the output signal whilst varying the temperature, T. It has been shown that X(T) of equation (1) has the form $$X(T) \propto b - T$$

The constant b is independent of applied bias and time. Equation 1 can thus be rewritten as $$G \approx (1 + \sigma(b-T))^N \quad (7)$$

where σ is independent of T but is a function of applied bias and time. For the usual range of gains (usually less than 5000×) and number of multiplication elements (usually greater than 400) equation 7 can be simplified to give $$G \approx \exp(N\sigma(b-T)) \quad (8)$$

If the output signal is determined at two different temperatures, $T_1$ and $T_2$, the gain at $T_1$ is $$G_1 = \exp\left(\frac{b-T_1}{T_2-T_1}\ln\left(\frac{S_1}{S_2}\right)\right) \quad (9)$$

Where $S_1$ is the output signal measured at $T_1$ and $S_2$ is the output signal measured at $T_2$, keeping the biases constant. The only term that needs to be determined is the value of b, which can be determined for a particular device type and is independent of applied bias and time. Equation (9) can be used to calculate the gain at the operating temperature if the output signal at this temperature and the output signal at a different temperature are known.

Taking a different approach it can be shown that $$\left.\frac{\partial G}{\partial V}\right|_{T=const} = cNG(1-G^{-1/n}) \quad (10)$$

and $$\left.\frac{\partial G}{\partial T}\right|_{V=const} = \frac{NG(1-G^{-1/n})}{T-b}. \quad (11)$$

Both of these derivatives are independent of the ageing term. Noting that the gain, G=output signal, $S_{out}$, divided by the input signal we have from equation (10)

$$G_{T=const} = \left(1 - \frac{1}{cNS_{out}}\frac{dS_{out}}{dV}\right)^{-N} \quad (12)$$

and from equation (11)

$$G_{V=const} = \left(1 - \frac{T-b}{NS_{out}}\frac{dS_{out}}{dT}\right)^{-N} \quad (13)$$

If the temperature is constant and the rate of change of output signal with applied bias around the operating point is known, the gain can be calculated using (12) with a knowledge of the constant c. Likewise, if the applied bias is constant and the rate of change of output signal with temperature around the operating point is known, the gain can be calculated using (13) with a knowledge of the constant b.

Figure 7:
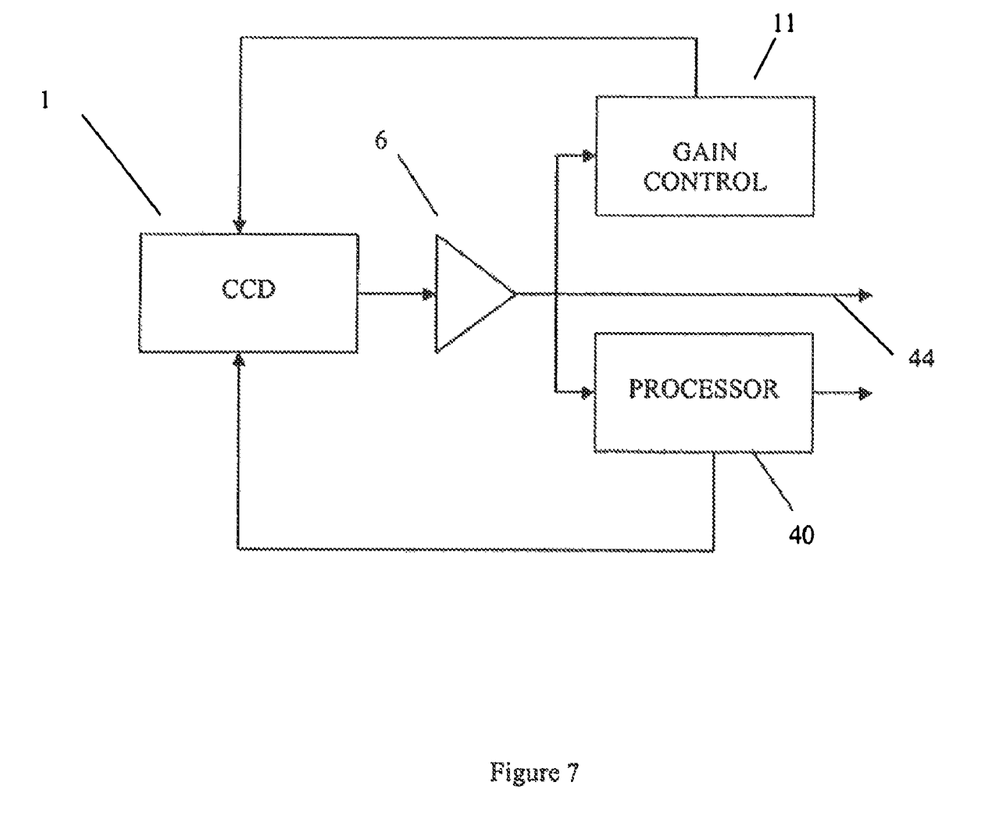
FIG. 7: is a schematic diagram of a system embodying the invention.

A device embodying the invention is shown in schematic form in FIG. 7 and comprises a CCD 1, a charge detection circuit 6 and an automatic gain control circuit 11 as previously described. In normal operation, the automatic gain control circuit provides a feedback signal to the CCD drive circuitry to control the drive voltage such that the required level of output signal is given. However, the absolute level of gain would not be known. In addition, the device incorporates a processor 40 arranged to receive an output signal from the CCD 1 via the charge detection circuit 6. In this mode the processor governs the CCD operation and the automatic gain control does not control the gain. The processor includes memory and logic so as to sample the output signal from output 44 and to store the sample for a given setting of the operational parameters such as drive voltage or at a given temperature. The CCD is then operated with different operational parameters. Typically this is by the processor instructing the CCD drive circuitry to apply a different drive voltage or by causing a change of temperature and the processor takes a second sample signal from output signal line 44. The processor then computes the gain as previously described.

The processor 40 is arranged to produce at least first and second signals with the two different settings of operational parameters. The first and second signals are derived from at least a plurality of pixels, more likely from multiple lines of pixels and preferably from whole frames of pixels. As shown by equations 12 and 13, the gain at a given setting of operational parameters may be derived from the rate of charge of the output signal with the operational parameter (Voltage or temperature). Accordingly, the output signal may be sampled at multiple settings of the operational parameters to derive the rate of charge of signal with operational parameter.

In the implementation in which the charge of signal with temperature is used, a particularly efficient method is to sample the output signal as the CCD device is cooled from ambient temperature to an operational temperature. Thus, part of the start sequence each time the device is used, is to accurately determine the gain at given voltage and temperature settings.

The processor may be implemented as a programmed DSP or could be a general purpose PC running appropriate software. The implementation as a DSP is particularly applicable to application in a camera in which the DSP could automatically determine the gain periodically during operation of the camera. The implementation as a PC is applicable to applications such as scientific applications. In such scientific applications, the alternative of varying the temperature may be particularly useful. The technique could be implemented by sampling the output signal as the CCD is cooled to its normal operating temperature so that a number of samples at different temperatures are taken. From these samples and measurements of the temperature the gain can be calculated. Similarly, if using variation of voltage, a range of different drive voltages could be scanned and an output sample taken at each from which the gain is determined.

The invention claimed is:

1. A device incorporating a CCD of the type for providing charge gain by impact ionization, the CCD including a multiplication register for producing charge gain on application of a drive voltage, the device having an output arranged to provide an output signal from the CCD and a processor arranged to receive the output signal, the processor being arranged to produce at least first and second signals from the output signal when different respective drive voltage levels are applied to the multiplication register, the drive voltages being set so that greater than unity gain is provided, and to derive the gain of the multiplication register at one of the respective drive voltages from the at least first and second signals and from the different respective drive voltages.

2. A device incorporating a CCD of the type for providing charge gain by impact ionization, the CCD including a multiplication register for producing charge gain on application of a drive voltage, the device having an output arranged to provide an output signal from the CCD and a processor arranged to receive the output signal, the processor being arranged to produce at least first and second signals from the output signal when the multiplication register is at different respective temperatures and to derive the gain of the multiplication register at one of the respective temperatures from the at least first and second signals and from the different respective temperatures.

3. A device according to claim 1, wherein the at least first and second signals are signals representing the average signal level for pixels within the CCD.

4. A device according to claim 3, wherein the first and second signals represent the average signal level for pixels within a frame.

5. A device according to claim 2, wherein the at least first and second signals are signals representing the average signal level for pixels within the CCD.

6. A device according to claim 5, wherein the first and second signals represent the average signal level for pixels within a frame.

7. A device according to claim 1, wherein the first and second signals are derived from the sum of the signal levels of pixels within a frame.

8. A device according to claim 2, wherein the first and second signals are derived from the sum of the signal levels of pixels within a frame.

9. A device according to claim 1, wherein the processor is operable to control the drive voltage level or the temperature of the multiplication register.

10. A device according to claim 1, wherein the processor is a DSP or FPGA.

11. A device according to claim 1, wherein the processor is arranged to derive the rate of change of output signal with voltage.

12. A device according to claim 1, wherein the processor is arranged to derive the rate of charge of output signal with temperature.

13. A method of deriving the gain of a CCD of the type for providing charge gain by impact ionization, the CCD including a multiplication register for producing charge gain on application of a drive voltage, comprising deriving at least first and second signals from the output signal when different respective drive voltage levels are applied to the multiplication register, the drive voltages being set so that greater than unity gain is provided, and determining the gain of the multiplication register at one of the respective drive voltages from the at least first and second signals and from the different respective drive voltages.

14. A method of deriving the gain of a CCD of the type for providing charge gain by impact ionization, the CCD including a multiplication register for producing charge gain on application of a drive voltage, comprising deriving at least first and second signals from the output signal when the multiplication register is at different respective temperatures and determining the gain of the multiplication register at one of the respective temperatures from the at least first and second signals and from the different respective temperatures.

15. A method according to claim 13, wherein the at least first and second signals are signals representing the average signal level for pixels within the CCD.

16. A method according to claim 14, wherein the at least first and second signals are signals representing the average signal level for pixels within the CCD.

17. A method according to claim 15, wherein the first and second signals represent the average signal level for pixels within a frame.

18. A method according to claim 16, wherein the first and second signals represent the average signal level for pixels within a frame.

19. A method according to claim 13, wherein the first and second signals are derived from the sum of the signal levels of pixels within a frame.

20. A method according to claim 14, wherein the first and second signals are derived from the sum of the signal levels of pixels within a frame.

21. A method according to claim 14, in which the method comprises measuring the output signal as the CCD is cooled to an operating temperature.

* * * * *